Figure 1:
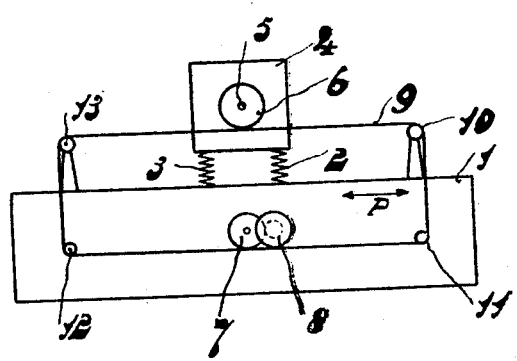

Jan. 23, 1951     J. C. A. RECOURT     2,539,033
ANTIVIBRATING DRIVING COUPLING BETWEEN RADIO CHASSIS
AND VARIABLE CONDENSER MOUNTED THEREON
Filed May 2, 1946

INVENTOR
JOHANNES CHRISTOFFEL ANTONIE RECOURT
ATTORNEY

Patented Jan. 23, 1951

2,539,033

UNITED STATES PATENT OFFICE 2,539,033

ANTIVIBRATING DRIVING COUPLING BETWEEN RADIO CHASSIS AND VARIABLE CONDENSER MOUNTED THEREON

Johannes Christoffel Antonie Recourt, Eindhoven, Netherlands, assignor to Hartford National Bank and Trust Company, Hartford, Conn., as trustee Application May 2, 1946, Serial No. 666,567
In Belgium February 8, 1945

Section 1, Public Law 690, August 8, 1946
Patent expires February 8, 1965

7 Claims. (Cl. 250—16)

This invention relates to an electric device, more particularly a radio-receiving set comprising a chassis having flexibly mounted on it a variable condenser, and a driving device which is coupled with the moving parts of the condenser and rigidly secured to the chassis.

Many electric devices comprise a chassis on which a variable condenser is flexibly mounted. This particularly applies to radio-receiving sets. In this case the flexible arrangement is chosen to minimize interferences owing to the so-called microphonic effect. These interferences may be caused inter alia by the transmission of mechanical vibrations from the chassis to the variable condenser. This transmission is strongly reduced by the flexible mounting of the condenser.

The driving device driving the movable condenser parts may be directly connected to the variable condenser. This construction, however, suffers from drawbacks. Both the mass of the vibrating system constituted by the flexibly arranged condenser and the total surface thereof are enlarged. This is undesirable with a view to freedom from microphony. When the driving knob is mounted on the variable condenser, the knob cannot only turn, but may also move to and fro with the body of the flexibly mounted condenser, due to which the construction feels unsolid. In the existing constructions the driving device is therefore rigidly secured to the chassis. This involves two other difficu'ties. The coupling transmitting the movement of the driving device to the variable condenser constitutes a connection between the chassis and the condenser. Through this connection a transmission of disturbing vibrations from the chassis to the variable condenser may occur. Furthermore troublesome backlash occurs in the driving device owing to the flexible arrangement. This will be set out more fully with reference to the description of the drawing.

The invention procures a construction which permits the last-mentioned difficulties to be overcome.

According to the invention the coupling between the moving parts of the condenser and the driving device is established by a flexible wire which is led along a flexible guide path which is not compressible in a longitudinal direction and which is fastened on the one hand to the chassis, on the other hand to a stationary part of the condenser.

Since forces occur in the wire and in the guide path which are equal but opposite to one another, the variable condenser is not subjected to forces, as a whole, but only its movable parts, with the result that backlash is avoided. It appears that in this way interfering vibrations are transmitted only to a very small degree.

In order that the invention may be clearly understood and readily carried into effect, it will now be explained more fully with reference to the accompanying drawing, given by way of example, in which Fig. 1 represents an electric device, in which a variable condenser is driven in a well-known manner.

Figure 2:
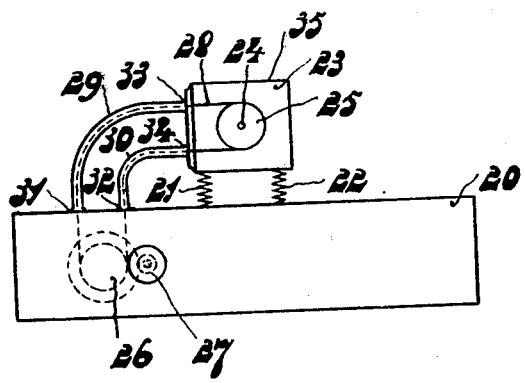

Fig. 2 represents diagrammatically an electric device according to the invention.

In Fig. 1 reference number 1 denotes the chassis of an electric device. This chassis has flexibly mounted on it, by means of springs 2 and 3, a variable condenser 4. The movable parts of the condenser are secured to the shaft 5 to which is keyed a rope pul'ey 6. This is driven by a driving device fastened to the chassis 1. It consists of a rope pulley 7 which is secured to the driving or tuning knob 8 through a friction coupling. The coupling between the driving device 7, 8 and the rope pulley 6 of the condenser 4 is effected by an endless rope 9 which is laid one or more times around the rope pulleys 6 and 7 and further passes, in the manner illustrated in the drawing, over rollers 10, 11, 12 and 13. A certain tension is maintained in the rope 9 by means known in the art, such as rollers on spring biased mountings. Due to this, vibration of the chassis can be transmitted by the rope in the direction of the arrow P to the condenser. The fact that in this arrangement comparatively considerable much backlash occurs appears from the following. In the rope 9 a certain minimum force must be available before the rest friction of the movable parts of the variable condenser is overcome. This minimum force causes a displacement of the condenser 4 on the springs 2 and 3 in the direction of the arrow P. Thus the tuning knob 8 must be turned through a given angle from its starting position, the condenser moving on the springs 2 and 3, before a displacement of the movable parts of the condenser takes place.

Fig. 2 shows an electric device, with reference to which the invention will be explained more fully.

The chassis 20 has flexibly mounted on it, on springs 21 and 22, a variable condenser 23, whose movable parts are secured to the shaft 24 to which the rope pulley 25 is fastened. The driving device which consists of a rope pulley 26 and a tuning knob 27 coupled thereto through friction wheels, is rigidly secured to the chassis 20. In this case the coupling between the rope pulleys 25 and 26 consists of an endless rope 28, whose two pieces 29 and 30 between the driving device and the condenser are each formed by the core wire of a Bowden cable. At 31 and 32 the sheaths of these cables are rigidly secured to the chassis and at 33 and 34 to the housing 35 of the variable condenser. Also, in this case, a certain rest friction must be overcome. Before rotation of the rope pulley 25 a certain minimum tension must occur in the rope 28. In the present case, however, this tension does not cause a displacement of the condenser 23 on the springs 21 and 22, since it is compensated by the opposite tension in the sheaths of the Bowden cables 29 and 30. The variable condenser, taken as a whole, is consequently not subjected to forces. It will be obvious that the backlash, which was due to the displacement of the condenser on the springs, does not occur in this case.

If the Bowden cable were stretched according to a straight line between the chassis and the condenser, longitudinal vibrations could propagate along the Bowden cable, so that undue vibrations would be transmitted from the chassis to the condenser. The occurrence of such longitudinal vibrations can be avoided by causing the axis of the Bowden cable to depart from a straight line. It may be seen from Fig. 2 that in the construction shown the two Bowden wires exhibit a curvature.

The present solution, according to which the core wire of the Bowden cable slides, has the advantage over the form of construction in which the core wire turns in the sheath, in that the backlash is smaller.

With the aid of the construction according to the invention it appears to be possible to drive a flexibly arranged condenser whose mechanical resonance frequency lies below 10 cycles per second without being troubled by the microphonic effect.

What I claim is:

1. In a radio-receiving set provided with a chassis, and a variable condenser flexibly mounted thereon and having a stationary part, a movable part, and driving means for said movable part of said variable condenser, said driving means comprising adjustable operator means mounted on said chassis, flexible wire means coupling said operator means and said movable part of said variable condenser to effect adjustment of said movable part of said variable condenser in accordance with said operator means, and a flexible guide path for said flexible wire means, said wire means being horizontally displaceable along said guide path, said flexible guide path being non-compressible in a longitudinal direction and being connected at one end to said chassis and at the other end to said stationary part of said condenser.

2. A radio-receiving set as claimed in claim 1 in which said flexible wire means and said flexible guide path means are the movable core wire and sheath, respectively, of a Bowden cable.

3. A radio-receiving set as claimed in claim 1 in which said flexible wire means are in the form of an endless rope.

4. A radio-receiving set as claimed in claim 1 in which the axis of said flexible wire means deviates from a straight line.

5. A radio-receiving set as claimed in claim 1 in which said flexibly-mounted variable condenser forms a vibratory system having values of mass and tension resulting in a mechanical resonance frequency which is lower than 25 cycles per second.

6. In an electrical assembly provided with a variable condenser having a stator and a rotor, said stator being flexibly mounted on a chassis, apparatus for driving said rotor comprising an adjustable operating member mounted on said chassis, a flexible wire coupled between said member and said rotor to impart movement of said member to said rotor, and a flexible guide channel for said flexible wire, said flexible guide channel being non-compressible in a longitudinal direction and being connected at one end to said chassis and at the other end to said stator, said flexible wire being displaceable longitudinally along said guide channel.

7. In an electrical assembly provided with a variable condenser having a stator and a rotor, said rotor having a pulley affixed thereto, said stator being flexibly mounted on a chassis, apparatus for driving said rotor comprising adjustable operating means including a pulley mounted on said chassis and a tuning knob engaging said pulley to effect rotation thereof, a continuous flexible cable coupled between the pulley on said chassis and the pulley on said rotor to effect movement of said rotor in accordance with the pulley on said chassis, and flexible sheath means enclosing said cable and connected at one end to said chassis and at the other end to said stator, said flexible sheath means being non-compressible in a longitudinal direction.

JOHANNES CHRISTOFFEL
ANTONIE RECOURT.

REFERENCES CITED

The following references are of record in the file of this patent:

UNITED STATES PATENTS

| Number | Name | Date |
| --- | --- | --- |
| 1,838,264 | Kerrigan | Dec. 29, 1931 |
| 1,905,539 | White | Apr. 25, 1933 |
| 2,168,984 | Grimes | Aug. 8, 1939 |
| 2,189,548 | Gent | Feb. 6, 1940 |
| 2,193,115 | Smith | Mar. 12, 1940 |

OTHER REFERENCES

Radio News of Feb. 1930, pages 722 and 773 (Figure 9).